United States Patent
Matsuoka

Patent Number: 5,609,231
Date of Patent: *Mar. 11, 1997

[54] TORSIONAL VIBRATION DAMPENING APPARATUS AND LOCK-UP CLUTCH MECHANISM FOR A TORQUE CONVERTER

[75] Inventor: Yoshihiro Matsuoka, Neyagawa, Japan

[73] Assignee: Exedy Corporation, Osaka, Japan

[*] Notice: The term of this patent shall not extend beyond the expiration date of Pat. No. 5,513,731.

[21] Appl. No.: 502,719

[22] Filed: Jul. 14, 1995

[30] Foreign Application Priority Data

Jul. 28, 1994 [JP] Japan ................................ 6-177190

[51] Int. Cl.$^6$ ................................................ F16H 45/02
[52] U.S. Cl. ........................ 192/3.29; 192/55.4; 192/208; 464/24
[58] Field of Search ................................ 192/3.29, 3.3, 192/208, 212, 55.4; 464/24, 68

[56] References Cited

U.S. PATENT DOCUMENTS

| | | | |
|---|---|---|---|
| 4,565,273 | 1/1986 | Tojima et al. | 192/208 |
| 4,828,533 | 5/1989 | Focqueur et al. | 464/24 |
| 4,987,981 | 1/1991 | Casse et al. | 192/3.29 |
| 5,097,722 | 3/1992 | Fukushima | 192/208 X |
| 5,103,688 | 4/1992 | Kuhne | 192/208 X |
| 5,125,486 | 6/1992 | Murata | 192/3.29 X |
| 5,180,044 | 1/1993 | Fukushima et al. | 192/208 |
| 5,240,457 | 8/1993 | Leichlliter et al. | 192/3.29 X |
| 5,355,747 | 10/1994 | Kajitani et al. | 192/208 X |
| 5,386,986 | 2/1995 | Matsuoka | 192/3.29 |
| 5,513,731 | 5/1996 | Matsuoka | 192/3.29 |

*Primary Examiner*—Charles A. Marmor
*Assistant Examiner*—Saul Rodriguez
*Attorney, Agent, or Firm*—Shinjyu Office of Patent Attorneys

[57] ABSTRACT

A torsional vibration dampening device 14 in a torque converter for dampening torsional vibration of torque transmitted from a piston to a driven plate includes an arc-shaped fluid chamber 26, a slider element 33, a seal element 30a and a choke C. The arc-shaped fluid chamber 26 is coupled to the piston and has an opening extending in circular directions. The slider element 33 sections the arc-shaped fluid chamber 26 in circular directions, are relatively movable in circular directions within the arc-shaped fluid chamber 26, and has a groove 30d corresponding to the opening. The seal element 30a is placed within the arc-shaped fluid chamber 26 and rotates along with the slider element 33 in unity to seal the opening. Fluid in the arc-shaped fluid chamber 26 pass the choke in accordance with the relative movement of the slider element 33.

16 Claims, 9 Drawing Sheets

TORSIONAL VIBRATION DAMPENING APPARATUS AND LOCK-UP CLUTCH MECHANISM FOR A TORQUE CONVERTER

BACKGROUND OF THE INVENTION

A) FIELD OF THE INVENTION

The present invention relates to a torsional vibration dampening apparatus and a lock-up device for a torque converter. More particularly, the torsional vibrational dampening apparatus includes inter-fitting fluid chamber portions having a slider therein which creates fluid flow resistance in response to displacement of relatively rotatable associated portions.

B) DESCRIPTION OF THE RELATED ART

Torque converters usually include a fluid coupling mechanism for transmitting torque between the crankshaft of an engine and the input shaft of an automatic transmission. In recent years, to improve fuel efficiency, some torque converters have included a lock-up devices that, upon reaching predetermined operating conditions, lock-up the torque converter so that power from the crankshaft of an engine is directly transmitted to the automatic transmission, bypassing the fluid coupling device. Upon engagement, lock-up devices often cause a shudder, or vibration. Further, while engaged, the lock-up device is subject to vibrations caused by sudden acceleration, or deceleration, or other vibration inducing circumstances associated with internal combustion engines. Consequently, torsional vibration dampening apparatus' are typically employed in lock-up mechanisms to dampen vibration.

One torsional vibration dampening apparatus employed in a lock-up device in the torque converter includes a fluid chamber which has an opening extending in circular directions and which is filled with viscous fluid. A slider member is disposed within the fluid chamber, divides the fluid chamber in circular directions into separate cells and is relatively movable in circular directions within the fluid chamber. The slider member is in contact with a rotary member coupled to the input shaft of the transmission and moves with the rotary member. A seal is provided to seal the opening. Relative movement by the slider within the chamber causes viscous fluid to flow through a clearance gap (choke) between the inner surfaces of the chamber and the outer surfaces of the slider from one cell of the chamber toward the other to produce viscous resistance. The seal element comes in press contact with other elements disposed outside the case to seal the opening of the fluid chamber. Since the seal element is placed outside the fluid chamber, however, it tends to deform. Deformation of the seal causes leakage of the viscous fluid from the fluid chamber, and as a result, a desirable level of viscous resistance cannot be obtained.

SUMMARY OF THE INVENTION

Accordingly, it is one object of the present invention to enhance a sealing performance in the fluid chamber of the torsional vibration dampening apparatus to attain a more desirable level of viscous resistance.

In one aspect of the present invention, a torque converter includes a lock-up mechanism and an associated vibration dampening device. The torque converter includes a power input member and a power output member disposed concentrically and being relatively rotatable with respect to one another. A disk member is connected to the power output member and has a plurality of protrusions extending therefrom. First and second side plates are interposed about the disk member, are connected to the disk member for limited rotary displacement with respect to the disk member, and portions of the first and second side plates define an annular chamber therebetween. A spring member is disposed between a portion of the disk member and the first and second side plates elastically coupling the disk member and the first and second side plates. A piston member is connected to the first and second side plates for rotation with the first and second side plates and the piston member selectively engagable with the power input member. At least two fluid chambers are defined within the annular chamber and are coupled to the first and second side plates for rotation therewith. Each of the fluid chambers further has an elongated circumferential opening formed therein. A slider is disposed within at least one of the fluid chambers and sections the fluid chamber into two sub-chambers, the slider being relatively movable in the circular directions within the fluid chamber, and having an engagement portion extending into the elongated circumferential opening. The slider is formed with a groove. Each protrusion extends through one of the elongated circumferential openings into the groove. The slider and inner surfaces of the fluid chamber define a choke through which fluid passes in response to rotary displacement of the slider with respect to the fluid chamber. A seal is positioned within the fluid chamber and is rotatable with the slider. The seal seals the elongated circumferential opening.

Preferably, each of the fluid chambers is formed with a circumferential inner wall, a portion of which forms the elongated circumferential opening. Further, the seal contacts the circumferential inner wall to seal the elongated circumferential opening in response to increased fluid pressure within the fluid chamber.

Preferably, each of the fluid chambers is formed from a pair of inter-fitting arcuate shaped chamber case members.

Preferably, each of the pair of inter-fitting arcuate shaped chamber case members is formed with a circumferential inner wall, which in combination, define the elongated circumferential opening. Further, the seal contacts the circumferential inner walls to seal the elongated circumferential opening in response to increased fluid pressure within the fluid chamber.

Preferably, each of the pair of inter-fitting arcuate shaped chamber case members is formed with a gap between each of the circumferential inner walls and a case portion of each of the interfitting arcuate shaped chamber case members, the seal disposed within the gap for radial movement.

Preferably, the slider and the seal are formed integrally.

Preferably, the slider is formed by two separate slider elements, each slider element being formed integrally with an associated seal member, each associated seal member having an elongated arcuate shape and being formed with one of the slider elements at each end of the seal member and each of the ends of the seal member extending into separate adjacent fluid chambers.

In another aspect of the present invention, a torque converter has a lock-up mechanism and a vibration dampening device. The lock-up mechanism is disposed between an input portion of a torque converter and an output portion of a torque converter, the lock-up mechanism having a fluid filled vibration dampening mechanism. The fluid filled vibration dampening mechanism is formed with a plurality of annularly arranged arc-shaped fluid chambers coupled to one of the input portion and the output portion for rotation therewith. Each of the arc-shaped fluid chambers is formed with an elongated opening on a radially inner portion extending circumferentially. The vibration dampening mechanism is further includes a plurality of annularly arranged slider seal members, each of the slider seal members formed with arc-shaped seal portions and two block-shaped slider elements, one of the block-shaped slider elements formed at each end of the arc-shaped seal portion, the arc-shaped seal portion extending between adjacent ones of the arc-shaped fluid chambers such that the block-shaped slider elements are disposed in the adjacent ones of the arc-shaped shaped fluid chambers. The arc-shaped seal portions engage a portion of the arc-shaped fluid chambers adjacent to the elongated openings to seal the elongated opening, and the slider seal members engage one of the input portion and the output portion for rotation therewith. The block-shaped slider elements divide the fluid chambers into separate sub-chambers and are movable relative to the fluid chambers in circular directions. Chokes are defined between inner surfaces of the fluid chambers and outer surfaces of the block-shaped slider elements for creating fluid flow resistance in response to relative movement of the block-shaped slider elements in the fluid chamber.

Preferably, the fluid chambers include wall portions defining the elongated openings, and the arc-shaped seal portions contact the wall portions to seal the elongated openings in response to fluid pressure within the fluid chambers.

Preferably, each of the fluid chambers also includes a pair interfitting case members.

Preferably, two of the block-shaped slider elements are disposed end to end in each of the fluid chambers, each of the two of the block-shaped slider elements from adjacent ones of the slider seal members.

In yet another aspect of the invention, the torque converter has lock-up mechanism and a vibration dampening device and includes a front cover and a power output element of a torque converter configured for torque transmission from the front cover to the power output element. A piston element is selectively engagable with the front cover and a disk-like element is coupled to the power output element for rotation therewith and has a plurality of first engagement portions. An elastic element is disposed between the piston element and the disk-like element so as to restrict relative rotation between them.

The lock-up mechanism includes a torsional vibration dampening device for dampening torsional vibration of torque transmitted from the piston element to the rotating element. The torsional vibration dampening device includes a plurality of arc-shaped fluid chambers coupled to the piston element for rotation therewith, each of the arc-shaped fluid chambers having an elongated opening extending circumferentially. The torsional vibration dampening device also includes a plurality of annular slider seal elements, each formed unitarily with an arc-shaped seal portion and two block-shaped slider elements, one of the block-shaped slider elements at each end of the arc-shaped seal portion, each of the annular slider seal elements further formed with second engagement portions engaging the first engagement portions, the slider elements dividing each the fluid chamber into two subchambers and being movable in circular directions relative to the fluid chambers, and the slider seal elements extending between adjacent ones of the fluid chambers to seal the elongated openings. The torsional vibration dampening device also includes chokes defined between inner surfaces of the fluid chambers and outer surfaces of the block-shaped slider elements allowing the passage of fluid between the sub-chambers in response to relative movement of the slider seal elements.

Preferably, each of the fluid chambers has circumferential walls defining the elongated opening, and the slider seal elements contact the walls to seal the elongated openings in response to increased pressure within the fluid chambers.

Preferably, each of the fluid chambers includes a pair of interfitting case components.

Further, the first and second engagement portions engage one another but are relatively rotatable with respect to one another within a predetermined range of angular displacement.

Further, the second engagement portions are concave grooves, and the first engagement portions are projections which extend through the elongated openings and are insertable into the concave grooves.

Preferably, the slider elements of the annular slider seal mechanism is a block divided in sections in circular directions.

In the torsional vibration dampening device in one aspect of the present invention, torsional vibration is transmitted from the power input rotating element to the fluid chamber or the slider. Accordingly, the slider relatively moves in circular directions within the fluid chamber. This causes the fluid to flow in the choke to produce viscous resistance. The viscous resistance dampens the torsional vibration. The seal rotates along with the slider in unity to seal the opening. Since the seal is placed within the fluid chamber, the seal is less likely to deform, and a higher performance of sealing the fluid chamber can be attained. Consequently, a high level of the viscous resistance is produced, and this sufficiently dampens the torsional vibration.

In the event that the fluid chamber has a wall defining the opening, the seal comes in press contact with the wall to seal the opening when pressure within the fluid chamber is raised. In this case, since the seal presses from the inside of the fluid chamber against the wall, a sealing performance within the fluid chamber is further enhanced.

When the fluid chamber consists of the pair of the case components, the sealing performance is further enhanced because an accuracy of dimensions of parts is improved.

In the torsional vibration dampening device in another aspect of the present invention, the torsional vibration is transmitted from the power input rotating element to the arc-shaped fluid chambers or the annular slider seal mechanism. Accordingly, the slider elements move in circular directions relative to the fluid chambers. Simultaneously, the fluid within the fluid chambers pass the choke to produce viscous resistance. The viscous resistance dampens the torsional vibration. The seal elements rotating along with the slider elements in unity and sealing the openings ensure a desired level of the viscous resistance. Since the seal elements are disposed within the fluid chambers, they do not deform so much, a higher performance of sealing the fluid chambers can be attained. Consequently, a large level of the viscous resistance is produced, and this sufficiently dampens the torsional vibration. Moreover, since the seal elements are continuously disposed within adjacent ones of the fluid chambers, they do not scrape against the adjacent fluid chambers so often.

In the event that the fluid chambers have walls defining the openings, the seal elements contact with the walls to seal the openings when pressure within the fluid chambers is raised. In this case, since the seal elements press from the fluid chambers against the walls, the sealing performance in the fluid chambers is further enhanced.

In the lock-up clutch according to the present invention, when the piston element engages in press contact with the front cover, the torque from the piston element is transmitted via the elastic element to the rotating element and is output to the power output rotating element. When the torsional vibration is transmitted from the front cover to the piston element, the elastic element repeats expansion and contraction and causes the piston element and the rotating element to relatively rotate. In the torsional vibration dampening apparatus, the slider elements relatively move in circular directions within arc-shaped fluid chambers, and simultaneously fluid in the fluid chambers passes the choke to produce viscous resistance. The viscous resistance dampens the torsional vibration. Accordingly, the seal elements rotate along with the slider elements in unity to seal the openings. Since the seal elements are disposed within the fluid chambers, herein, the seal elements do not deform so much, and a higher performance of sealing the fluid chambers can be attained. Consequently, a high level of the viscous resistance is produced, and this sufficiently dampens the torsional vibration. Moreover, since the seal elements are continuously disposed within adjacent ones of the fluid chambers, the seal elements do not scrape against the adjacent fluid chambers so often.

In the event that the fluid chambers have the walls defining the openings, the seal elements press the walls outward from the fluid chambers to seal the openings when the fluid passes the chokes to raise pressure within the fluid chambers. In this case, since the seal elements contact the walls in response to fluid pressure and are therefore urged radially inward from the fluid chambers, the sealing performance within the fluid chambers is further enhanced. Hence, the fluid does not leak from the fluid chambers so much, and a high level of viscous resistance is attained.

In the event that each of the fluid chambers includes the pair of the case components, since an accuracy of dimensions of parts is improved, the sealing performance of the fluid chambers is further enhanced.

In the event that the slider elements are a block divided in sections in circular directions, the annular slider seal mechanism is divided in circular directions, and it is facilitated assembling and disassembling the annular slider seal mechanism with the rotating element.

In the event that the first and second engagement portions are relatively rotatable within a range of a given angle, the torsional vibration of a small displacement angle causes the slider elements to rotate along with the arc-shaped fluid chambers in unity. Hence, no fluid from the fluid chambers pass the chokes. A high level of the viscous resistance should not be produced for the torsional vibration of a small displacement angle, so that elasticity of the elastic element alone effectively dampens the torsional vibration.

In the event that the second engagement portions are concave while the first engagement portions are projections, the configuration of the device is simple and engagement of both the engagement portions is facilitated.

When the chokes are defined by and between the slider elements and the fluid chambers, an accuracy of dimensions is improved, and therefore, a higher level of the viscous resistance is attained.

These and other objects, features, aspects and advantages of the present invention will become more fully apparent from the following detailed description of the present invention when taken in conjunction with the accompanying drawings where like reference numerals denote corresponding parts throughout, in which:

DETAILED DESCRIPTION OF THE DRAWINGS

Figure 1:
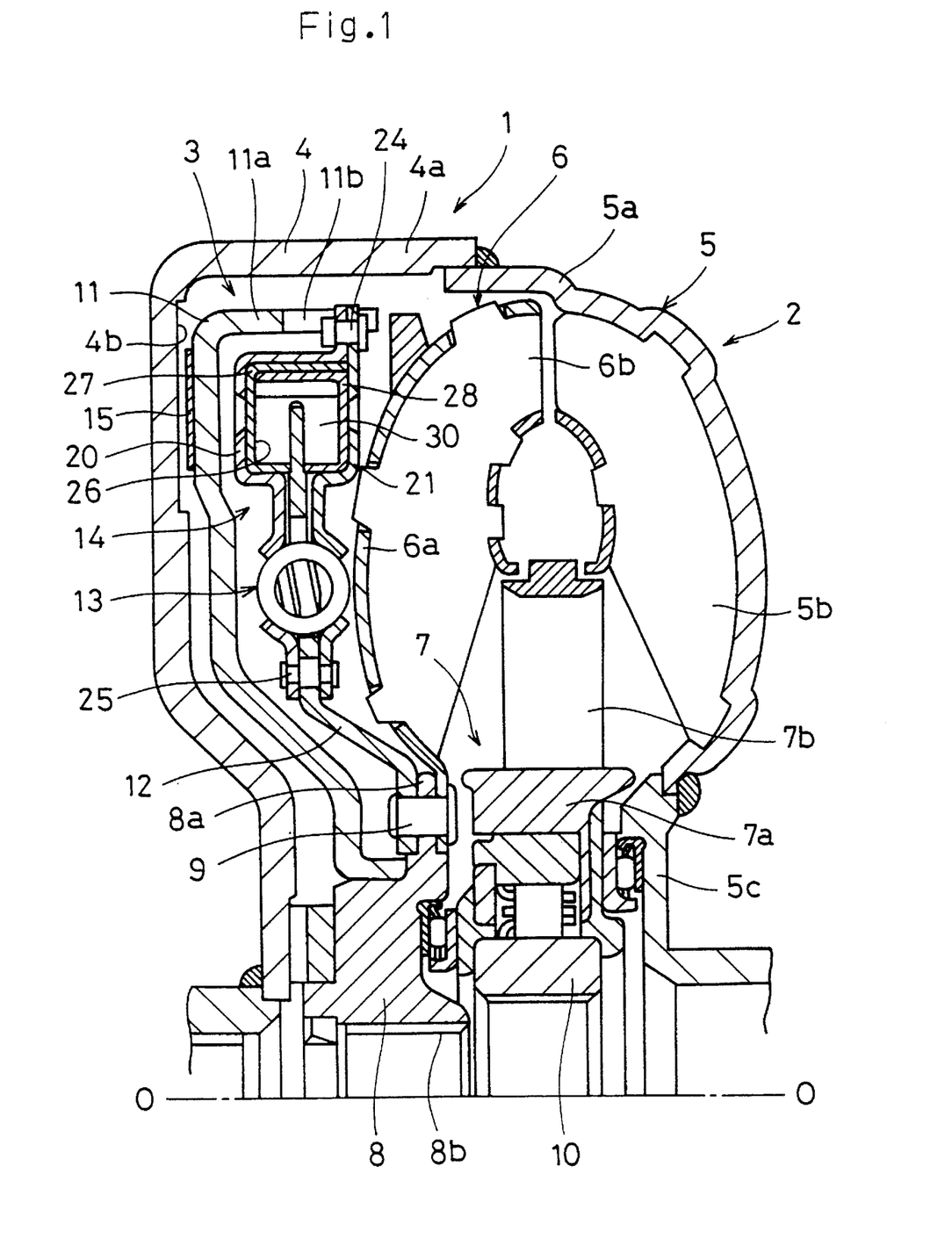
FIG. 1 is a fragmentary, vertical cross sectional view showing a torque converter in accordance with one embodiment of the present invention where the line O—O represents a rotational axis about which the torque converter rotates.

FIG. 1 shows a torque converter 1 in one embodiment according to the present invention. Referring to FIG. 1, line O—O is rotation axis line of a the torque converter 1. In a typical application of the present invention, an engine (not shown) is disposed on a left side of the torque converter 1 in FIG. 1, and a transmission (not shown) is disposed on a right side of FIG. 1.

The torque converter 1 includes a torque converter main body 2 and a lock-up device 3. A front cover 4, configured to be coupleable to a crankshaft of an engine (not shown), has at its outer circumference a cylindrical projection 4a protruding toward the transmission, and the projection 4a is fixed to an impeller shell 5a of an impeller 5. The front cover 4 and the impeller shell 5a define and enclose a hydraulic oil chamber filled with hydraulic oil.

The torque converter main body 2 includes the impeller 5, a turbine 6 driven by flow of fluid from the impeller 5, and a stator 7.

The impeller shell 5a of the impeller 5 has its inner circumferential end fixed to an impeller hub 5c. Inside the impeller shell 5a, a plurality of impeller blades 5b are welded. Opposing the impeller 5, a turbine 6 is positioned. The turbine 6 includes a turbine shell 6a and a plurality of turbine blades 6b welded to the turbine shell 6a. The turbine shell 6a has its inner circumferential end fixed to a flange 8a of a turbine hub 8 by a plurality of rivets 9. The turbine hub 8 has at its inner circumference a plurality of splines 8b in which a power input shaft (not shown) of the transmission is fitted.

The stator 7 is disposed between an inner circumferential portion of the impeller 5 and an inner circumferential portion of the turbine 6. The stator 7 directs the direction of the hydraulic oil fed back from the turbine 6 to the impeller 5 to increase a torque ratio, and it includes an annular stator carrier 7a and a plurality of stator blades 7b provided in an outer circumferential surface of the stator carrier 7a. The stator carrier 7a is coupled to an inner race 10 with a one-way clutch mechanism intervening between them. The inner race 10 is coupled to a rigid shaft (not shown) extending from the transmission.

The lock-up device 3 is disposed between the front cover 4 and the turbine 6. The lock-up device 3 is an apparatus for selectively transmitting torque from the front cover 4 directly to the turbine hub 8. The lock-up device 3 includes a disk-shaped piston 11, a disk-shaped driven plate 12, first and second side plates 20 and 21 rotating along with the piston 11 in unity, an elastic coupling mechanism 13 elastically coupling the plates 20 and 21 to the driven plate 12 in circular directions, and a torsional vibration dampening device 14 for dampening torsional vibration between the plates 20, 21 and the driven plate 12.

The piston 11 has its inner circumferential end in radial directions slidably supported in axial and circular directions on an outer circumferential surface of the turbine hub 8. An annular friction element 15 is bonded to an outer circumferential surface of the piston 11 facing a friction surface 4b of the front cover 4. The piston 11 has at its outer circumferential end a cylindrical outer circumferential wall 11a extending toward the transmission. Six notches 11b are formed on the outer circumferential wall 11a at an edge close to the transmission. The six notches 11b are formed at equal intervals in circular directions and extend in axial directions.

A driven plate 12 is formed with six radially extending projections 12a which protrude outward in radial directions and are arranged at uniform intervals in circular directions, corresponding to the intervals between the six notches 11b. The projections 12a engage the torsional vibration dampening device 14, as is described in greater detail below. As is more clearly shown in FIG. 2, the driven plate 12 is also formed with eight of window holes 12b extending in circular directions. Close to the inner parts of the window holes 12b, a plurality of holes 12c elongated in circular directions are formed. As is shown in FIG. 1, the driven plate 12 has its inner circumferential end fixed to the flange 8a of the turbine hub 8 by the rivets 9.

The first side plate 20 and the second side plate 21 are annular in shape and respectively have at their outer circumferential portions projections 20b and 21b (see FIG. 2 and FIG. 3) at given intervals in circular directions. The projections 20b and 21b are fixed to each other by rivets 24 and mesh with the notches 11b in the piston 11 so that the piston 11 is able to slide in axial directions relative to the projections 20b and 21b, but engage the projections 20b and 21b for rotation therewith. The side plates 20 and 21 fixed to one another at inner circumferential ends by stopper pins 25 which are inserted in the elongated holes 12c of the driven plate 12. Hence, the side plates 20, 21 and the driven plate 12 are relatively rotatable within a range of a predetermined angle, the predetermined angle defined by the circumferential length of the elongated holes 12c. The first and second side plates 20 and 21 are respectively provided with cut-and-raised portions 20c and 21c at their inner circumferences which confine and retain springs 34, as is described in greater detail below.

Figure 2:
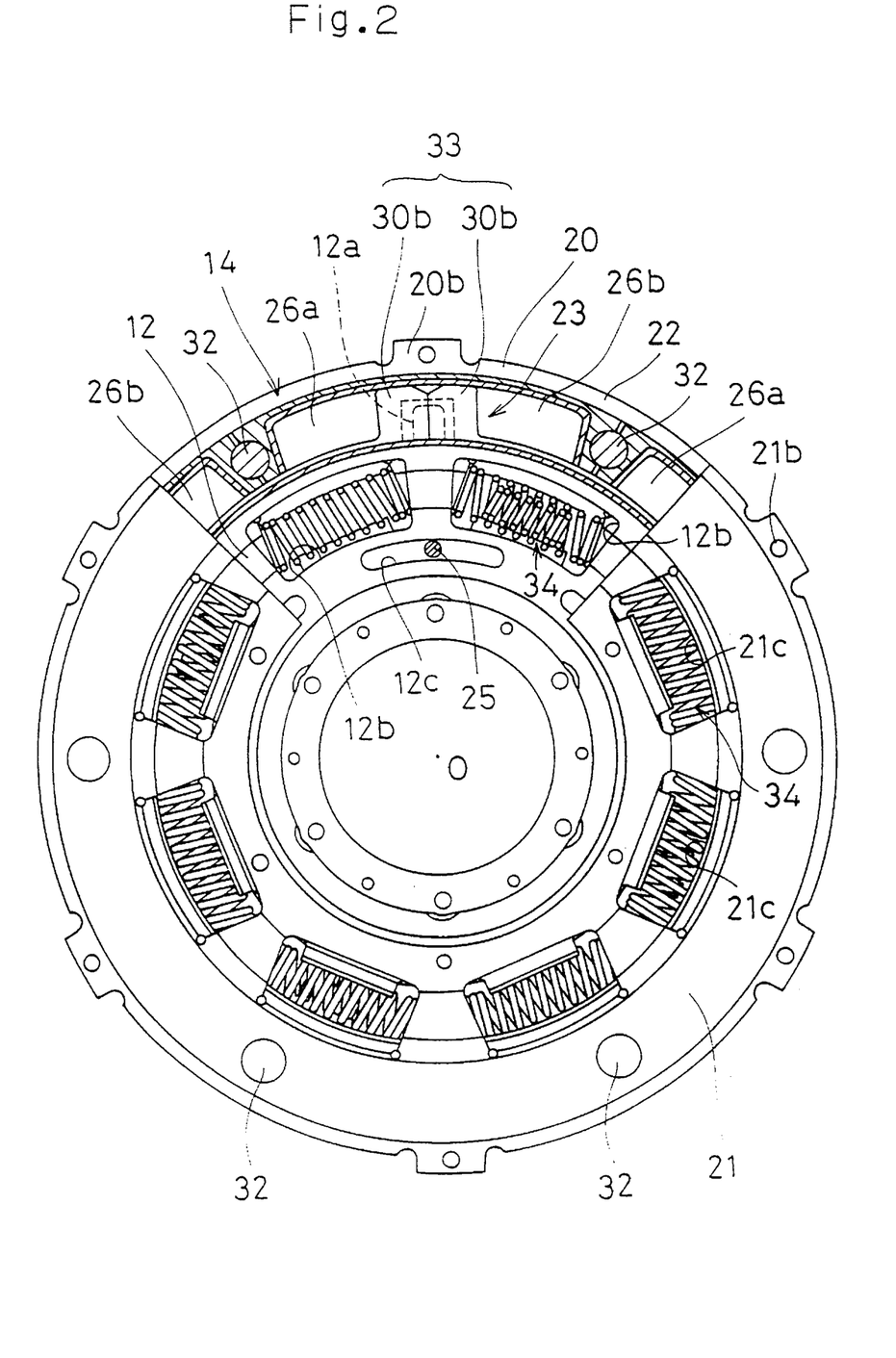
FIG. 2 is a part elevation, part cut-away view showing features of a fluid damping mechanism associated with a lock-up device in the torque converter depicted in FIG. 1.

The elastic coupling mechanism 13 includes eight coil springs 34, one coil spring 34 disposed within each window holes 12b. The coil springs 34 are confined axially by the cut-and-raised portions 20c and 2 1 c. The coil springs 34 restrict relative movement between the driven plate 12 and the first and second side plates 20 and 21. The coil springs 34 have their opposite ends in circular directions brought in contact with opposite ends in circular directions of the windows 12b and opposite ends in circular directions of the cut-and-raised portions 20c and 21c. In this way, the coil springs 34 are compressed by and between the first and second side plates 20, 21 and the driven plate 12 when there is relative rotation between the driven plate 12 and the first and second side plates 20 and 21. In an outer circumference of the first side plate 20, an annular cavity 20a extending close to the piston 11 is formed.

The torsional vibration dampening device 14 includes an annular case 22 and an annular slider seal mechanism 23.

Figure 3:
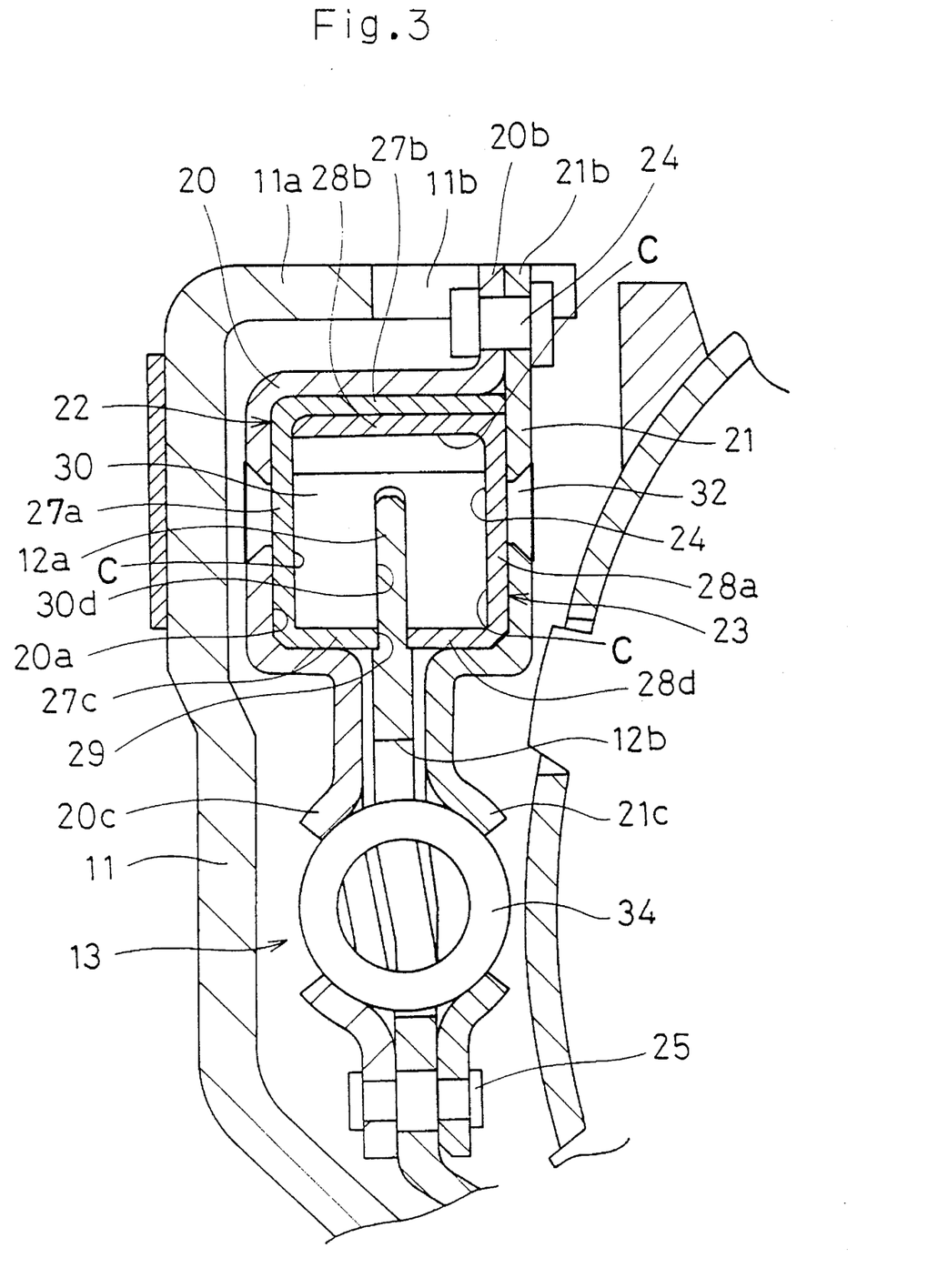
FIG. 3 is a fragmentary view of a portion of FIG. 1, on a slightly enlarged scale, showing a cross section of the lock-up device depicted in FIG. 2.
Figure 4:
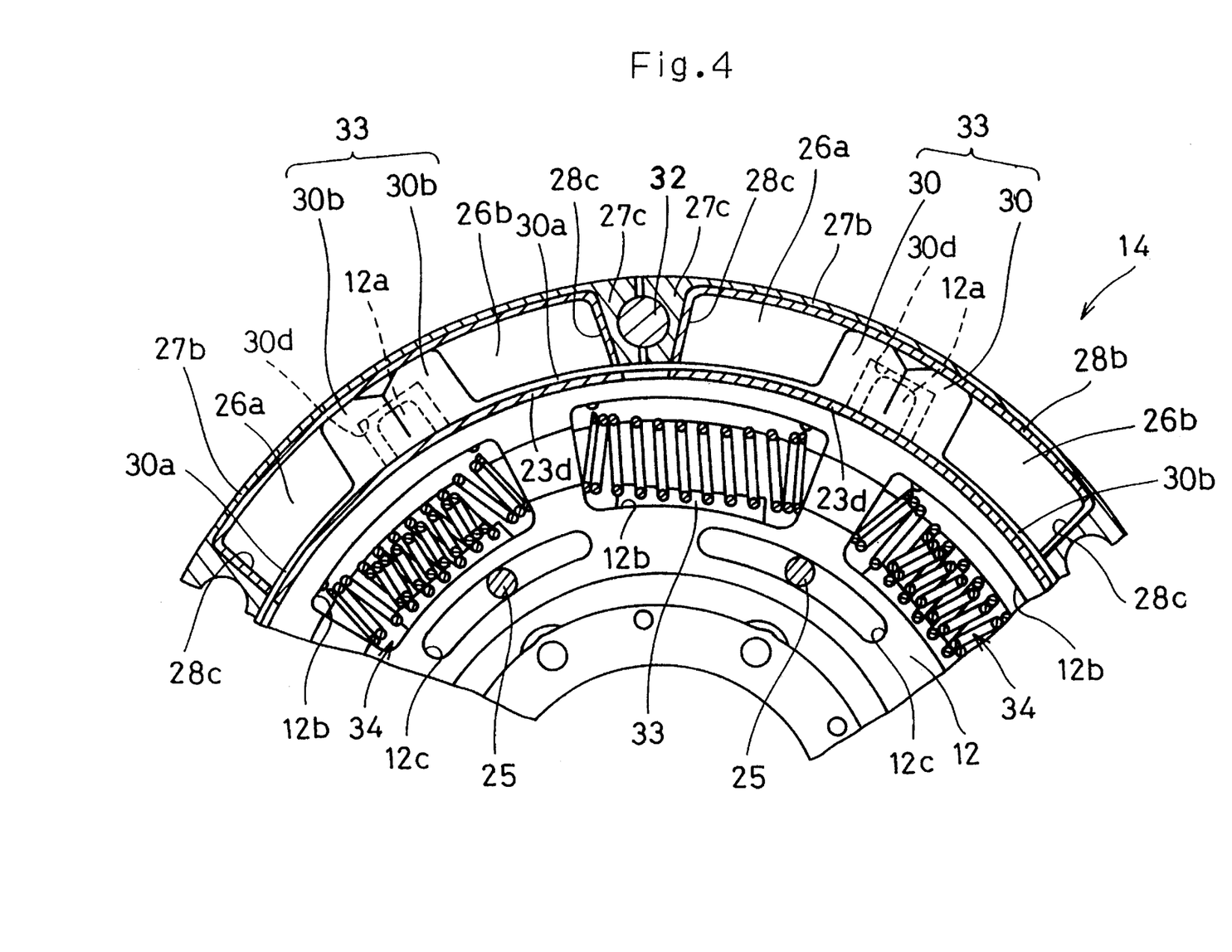
FIG. 4 is a fragmentary view of a portion of FIG. 2, on s slightly enlarged scale.

The annular case 22 is disposed in the annular cavity 20a between the first side plate 20 and the second side plate 21, as is shown in FIG. 3. The annular case 22 is defined by six arc-shaped fluid chambers 26, two of which are depicted in FIG. 4. Each of the arc-shaped fluid chambers 26 is defined by a pair of first and second cases 27 and 28.

Figure 6:
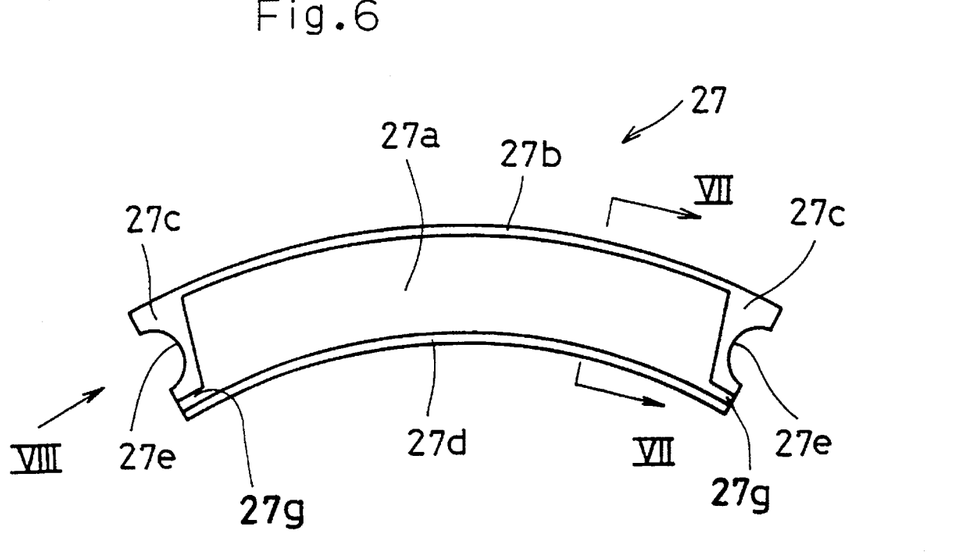
FIG. 6 is a front elevation view showing a first case portion of the annular slider seal mechanism shown removed from the other elements in the annular slider seal mechanism.
Figure 7:
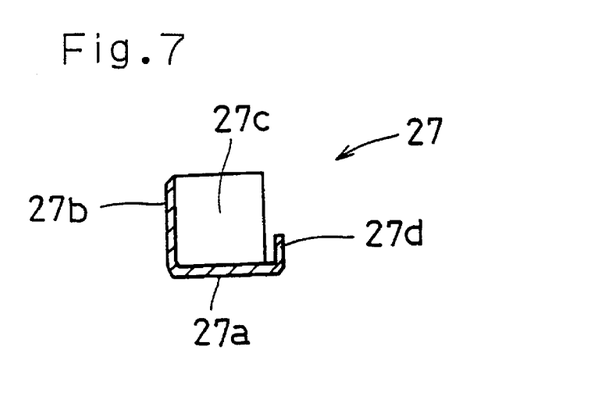
FIG. 7 is a sectional view of the first case portion of the annular slider seal mechanism, taken along the line VII—VII of FIG. 6.
Figure 8:
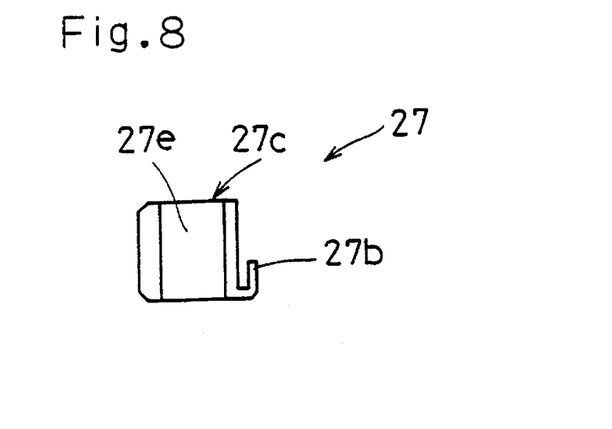
FIG. 8 is an end view of the first case portion of the annular slider seal mechanism, looking in the direction of the arrow VIII of FIG. 6.

As shown in FIG. 6 to FIG. 8, the first case 27 has an arcuate shape. The first case 27 has a side wall 27a in contact with the annular cavity 20a of the first side plate 20, an outer circumferential wall 27b provided in an outer circumference of the side wall 27a, walls 27c on opposite sides in circular directions of the outer circumferential wall 27b, and an inner circumferential wall 27d extending from the side wall 27a in an axial direction. The walls 27c are formed with semicircular grooves 27e which are semicircular in shape when viewed in axial directions and which extend in the axial directions. As is shown in FIGS. 2 and 4, each two adjacent semicircular grooves 27e in pairs of adjacent walls 27c define a hole through which stud pins 32 extend. The stud pins 32 further have respective opposite ends fixed to the side plates 20 and 21. This allows the first cases 27 or the arc-shaped fluid chambers 26 to rotate along with the side plates 20 and 21 in unity. The length, in an axial direction, of the inner circumferential wall 27d is a half of or shorter than the length in an axial direction of the outer circumferential wall 27b. As can be seen in FIG. 6, a predetermined clearance gap 27g is formed between the inner circumferential wall 27d and the walls 27c in radial directions. The clearance gaps 27g are continuous to the clearance gaps 27g in adjacent one of the first cases 27.

Figure 9:
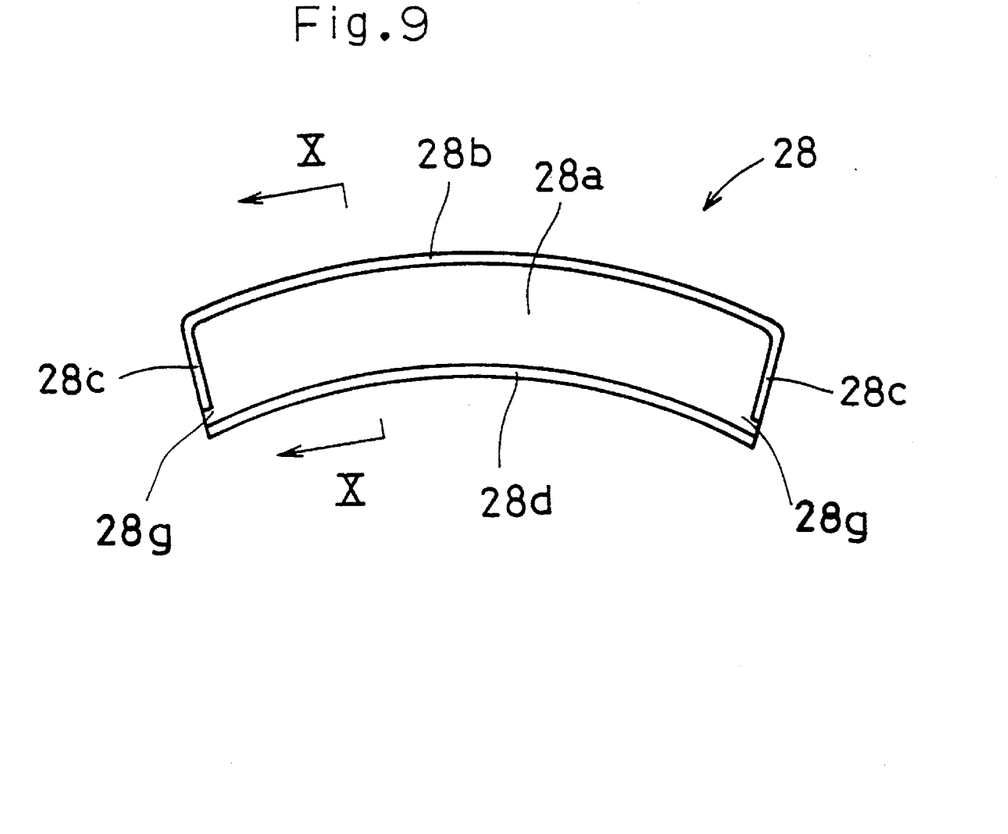
FIG. 9 is a front elevation view showing a second case portion of the annular slider seal mechanism shown removed from the other elements in the annular slider seal mechanism.
Figure 10:
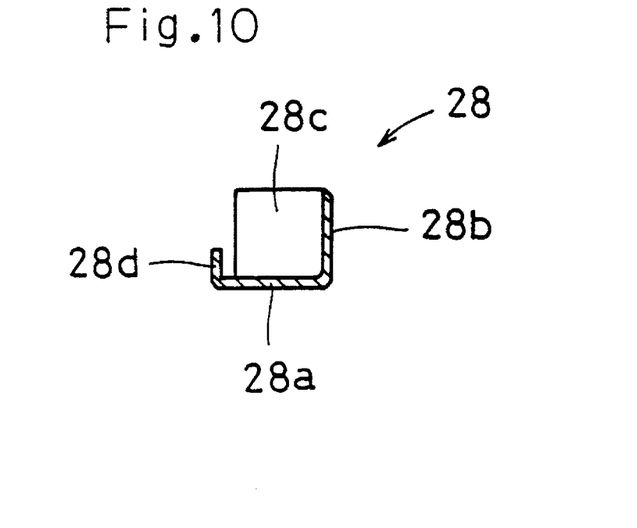
FIG. 10 is a sectional view of the second case portion of the annular slider seal mechanism, taken along the line X—X of FIG. 9.

As illustrated in FIGS. 3, 9 and 10, the second cases 28 are formed with an arcuate shape. The second cases 28 are fitted in the first cases 27 to partially define the arc-shaped fluid chamber 26. Each of the second cases 28 includes a side wall 28a in contact with the second side plate 21, an outer circumferential wall 28b extending from the side wall 28a in axial directions and fitted on the inside of the outer circumferential wall 27b, walls 28c fitted on the inside of the walls 27c of each first case 27, and an inner circumferential wall 28d extending from the side wall 28a in axial directions. A length in an axial direction of the inner circumferential wall 28d is a half of or shorter than a length in an axial direction of the outer circumferential wall 23b.

As is seen in FIG. 3, the inner circumferential wall 28d and the inner circumferential wall 27d of the first case 27d define an opening 29. The opening 29 is elongated in circular directions in an inner circumference of each of the arc-shaped fluid chambers 26. The projections 12a of the driven plate 12 extend radially outwardly into the opening 29 and hence into the fluid chambers 26. Because the driven plate 12 and the side plates 20 and 21 are configured for limited rotary displacement with respect to one another, the projections 12a may also undergo limited rotary displacement within the fluid chambers 26, as is described in greater detail below. A predetermined clearance gap 28g is formed between the inner circumferential wall 28d of the second case 28 and the walls 28c in radial directions.

The arc-shaped fluid chambers 26 are filled with the same hydraulic oil that fills the torque converter main body 2, and the annular slider seal mechanism 23 is fitted in the fluid chambers 26 so as to be slidable in circular directions. The annular slider seal mechanism 23 is made up of six slider seal elements 30 in combination.

Figure 11:
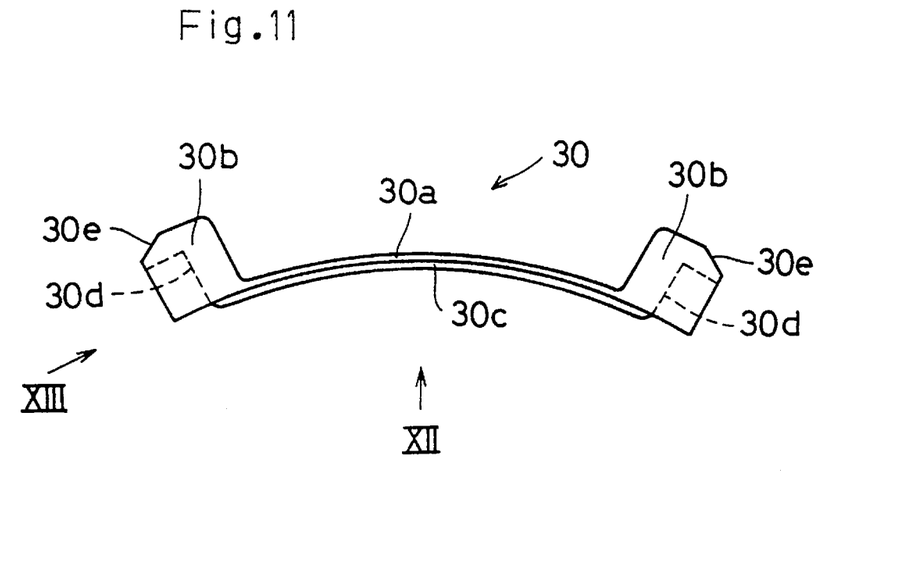
FIG. 11 is a front elevation view showing a slider seal element of the annular slider seal mechanism shown removed from the other elements in the annular slider seal mechanism.
Figure 12:
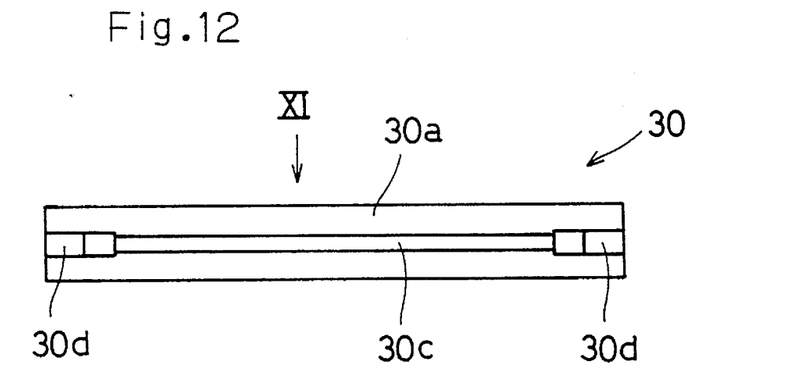
FIG. 12 is an inner radial view of the slider seal element, looking in the direction of the arrow XII in FIG. 11.
Figure 13:
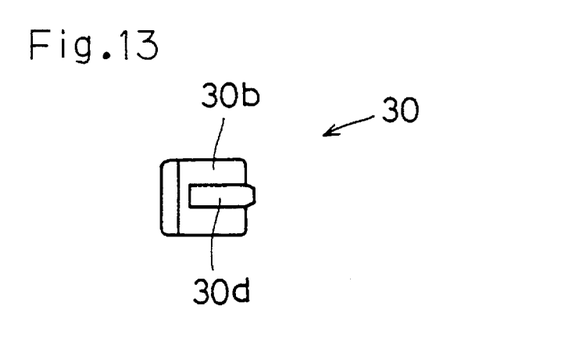
FIG. 13 is an end view of the slider seal element, looking in the direction of the arrow XIII of FIG. 11.

As shown in FIGS. 11 through 13, each of the slider seal elements 30 includes an arc-shaped seal portion 30a and blocks 30b provided on opposite ends in circular directions. On an inner circumferential portion of the each seal portion 30a, a reinforcing projection 30c is formed. Deep grooves 30d are formed at each end of the slider seal elements 30 on an outside portion of the blocks 30b. Each of the blocks 30b has its outside corner in both radial and circular direction chamfered to make a portion 30e, as is shown in FIG. 11.

Figure 5:
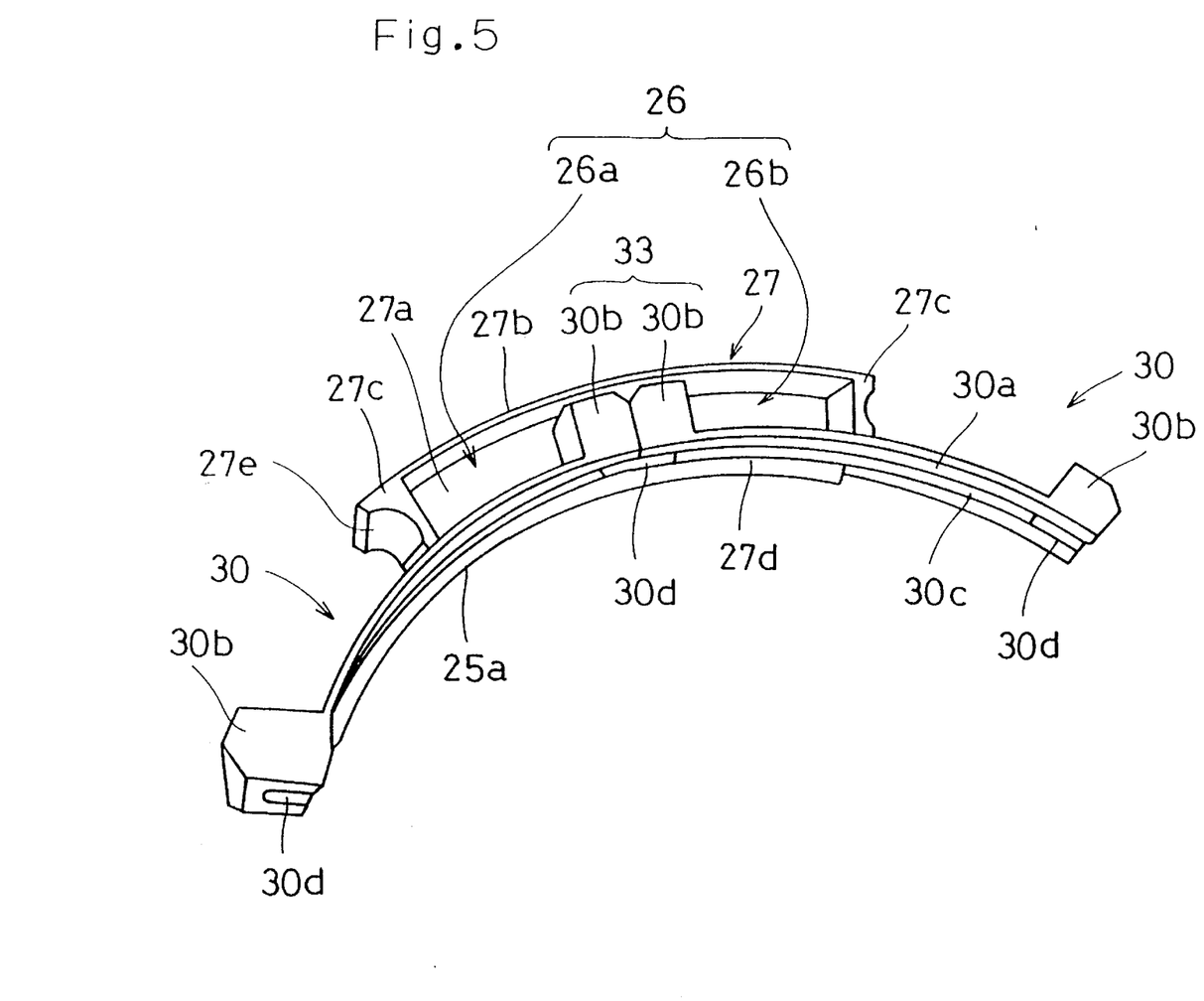
FIG. 5 is a perspective view of elements of an annular slider seal mechanism of the fluid damping mechanism depicted in FIGS. 2 and 4.
Figure 14:
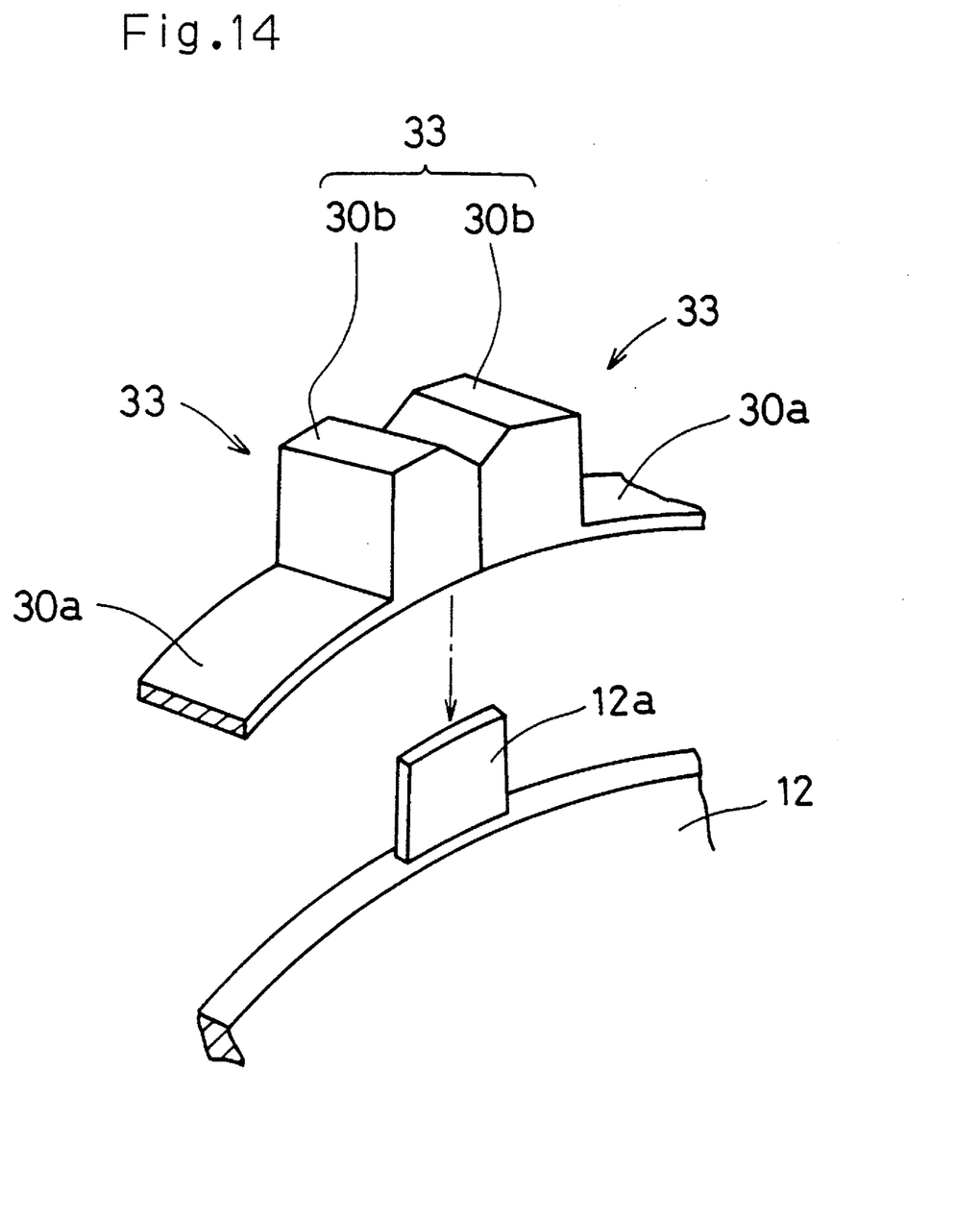
FIG. 14 is a fragmentary, perspective, exploded view showing assembly of a driven plate with two slider seal elements of the annular slider seal mechanism.

The blocks 30b of each slider seal element 30 are placed within adjacent ones of the arc-shaped fluid chambers 26; specifically, two of the blocks 30b of adjacent slider seal elements 30 are mated in contact with each other, roughly in the middle of each fluid chamber 26, to define a slider 33, as shown in FIGS. 4, 5 and 14. Since the blocks 30b are in contact with one another in circular directions, the slider seal elements 30 together move in unity. Each of the sliders 33 divides each of the arc-shaped fluid chambers 26 into a cell 26a on a side of R1 and a cell 26b on a side of R2, as is indicated in FIGS. 4 and 5. A predetermined clearance gap C (FIG. 3) is defined between each slider 33 and the walls of each fluid chamber 26, and the clearance gap C works as a choke to restrict the flow of fluid between the cells 26a and 26b.

In the groove 30d of each slider 33 (a combination of the grooves 30d in two blocks 30b), the projection 12a of the driven plate 12 is inserted. The combined length of the two adjacent grooves 30d is greater that the circumferential width of the projection 12a, as can be seen in phantom in FIG. 4. Thus there is a clearance between the projection 12a and the inner ends of the grooves 30d. Correspondingly, the projection 12a is slideable in a circular direction within a predetermined angle within the grooves 30d of the slider 33. This allows the slider 33 to rotate relative to the projection 12a along an arc at the predetermined angle.

Each of the seal portions 30a are continuously arranged to extend between two adjacent arc-shaped fluid chambers 26. Because of continuity of the seal portions 30a, the seal portions 30a do not scrape readily against the boundary of the arc-shaped fluid chambers 26. The seal portions 30a are tightly in contact with the inner circumferential walls 27d of the first cases 27 and the inner circumferential walls 28d of the second cases 28 and extend into the grooves 27g and 28g. The seal portions 30a are held by both the inner circumferential walls 27d, 28d and the walls 27c of the first cases 27 in a radial direction.

An operation of the device will be described below.

When the engine revolves, torque is applied to the front cover 4. The impeller 5 rotates along with the front cover 4, and the hydraulic oil flowing from the impeller 5 rotates the turbine 6. Flow of the hydraulic oil fed back from the turbine 6 to the impeller 5 is regulated by the stator 7. The torque of the turbine 6 is transmitted to the power input shaft (not shown) of the transmission with the turbine hub 8 intervening between them.

When the power input shaft of the transmission begins to rotate at a predetermined speed, hydraulic pressure within the hydraulic oil chamber in the torque converter 1 rises and the hydraulic pressure between the front cover 4 and the piston 11 decreases relative to the pressure within the hydraulic oil chamber in the torque converter 1, and this causes the piston 11 to be pressed against the front cover 4. Consequently, the friction element 15 of the piston 11 is brought in press contact with the friction surface 4b of the front cover 4, and the torque from the front cover 4 is mechanically transmitted to the turbine hub 8 through the lock-up device 3. Specifically, the torque is transmitted in the following order: from the front cover 4 to the side plates 20 and 21, the elastic coupling mechanism 13 and the driven plate 12. Since the stud pins 32 enable the side plates 20, 21 and the torsional vibration dampening device 14 to rotate together in unity, the torque from the engine can be also transmitted to the torsional vibration dampening device 14.

During the above described lock-up operation, variation in the torque of the engine is transmitted as torsional vibration to the lock-up device 3. When the torsional vibration is transmitted, the first and second side plates 20, 21 and the driven plate 12 rotate relative to one another, and the torsional vibration dampening device 14 is actuated.

When torsional vibration of a small displacement angle is input to the torsional vibration dampening device 14, the sliders 33 rotate along with the arc-shaped fluid chambers 26 in unity and move in circular directions relative to the driven plate 12. In this situation, since the sliders 33 rotate along with the fluid chambers 26 in unity, no fluid flows in the choke C. Thus, a high level of viscous resistance is not created, and the torsional vibration of a small displacement angle is effectively absorbed simply by expansion and contraction of the coil springs 34.

When torsional vibration of a relatively large displacement angle is input to the torsional vibration dampening device 14, the sliders 33 mesh with the projections 12a, and the sliders 33 move in circular directions relative to the arc-shaped fluid chambers 26. Simultaneously, the hydraulic oil in the cells 26a or the cells 26b flows through the choke C defined by and between the sliders 33 and the cases 27, 28 to the cells 26a and 26b on opposite sides of the sliders 33. In this situation, a high level of viscous resistance is produced to dampen the torsional vibration of the large displacement angle.

During the above described operation, the seal portions 30a are pressed against the inner circumferential walls 27d and 28d of the arc-shaped fluid chambers 26 by pressure caused in the cells of decreased volume so as to seal the inside of those cells.

Performance of sealing the arc-shaped fluid chambers 26 is enhanced because of the following characteristics: (a) Since the seal portions 30a are placed inside the arc-shaped fluid chambers 26 so as to be in press contact with the inner circumferential walls 27d and 28d, the seal portions 30a do not easily deform; and (b) Since the arc-shaped fluid chambers 26 are comprised of the first and second cases 27 and 28, a high level of accuracy of dimensions can be maintained.

As has been described, enhancement of the sealing performance on the cells of the decreasing volume of the arc-shaped fluid chambers 26 results in increase in the viscous resistance generated in the choke. Consequently, the torsional vibration of a large displacement angle can be sufficiently dampened.

When the torsional vibration is transmitted, a large level of contraction force is applied to the cells of increased volume. However, the hydraulic oil trapped by parts defined by adjacent ones of the chamfered portions 30e in the blocks 30b flows into those cells, and the cells are rapidly filled with the hydraulic oil. Hence, the force compressing the cells is relaxed.

Before attaching the driven plate 12 to the first side plates 22 and the first cases 27, as shown in FIG. 14, adjacent ones of the blocks 30b of the slider seal elements 30 are mated to form the sliders 33, and the sliders 33 mesh with the projections 12a of the driven plate 12 from the outside in radial directions. In this way, the annular slider seal mechanism 23 is not of a configuration of a unit extending in circular directions but of a configuration of divided interlocking sections arranged in the circular directions, and therefore, an improved performance of assembly is attained, and replacement of components is easily facilitated.

In a torsional vibration dampening device in an aspect of the preset invention, since a seal is placed within a fluid chamber, the seal does not deform so much, and a high performance of sealing the fluid chamber is attained. As a result, a high level of viscous resistance is produced to sufficiently dampen the torsional vibration.

Since the fluid chamber has a wall defining an opening, and since the seal comes in press contact with the wall outward from the fluid chamber, the sealing performance within the fluid chamber is further enhanced.

Since the fluid chamber includes a pair of case components, a higher accuracy of dimensions of parts is attained, and the sealing performance of the fluid chamber is further enhanced.

In a torsional vibration dampening device in another aspect of the present invention, since seals are placed within fluid chambers, the seals do not deform so much, and a higher performance of sealing the fluid chambers is attained. As a result, a high level of viscous resistance is produced, the torsional vibration is sufficiently dampened. In addition to that, since the seals are continuously displaced within adjacent ones of the fluid chambers, the seals do not scrape against the adjacent fluid chambers.

In the event that the fluid chambers have walls defining openings, since the seals come in press contact with the walls outward from the fluid chambers, the sealing performance of the fluid chambers is further enhanced.

Each of the fluid chambers includes a pair of case components and therefore a higher accuracy of dimensions of parts is attained and the sealing performance of the fluid chambers is further enhanced.

The sliders are in the form of block divided in sections in circular directions, an annular slider seal mechanism is divided in sections in circular directions, and it is facilitated assembling and disassembling the annular slider seal mechanism with a rotating element.

In a lock-up clutch according to the present invention, since seals are placed within fluid chambers, the seals do not transform so much, and a higher performance of sealing the fluid chambers is attained. As a result, a high level of viscous resistance is produced, the torsional vibration is sufficiently dampened. In addition to that, since the seals are continuous within adjacent ones of the fluid chambers, the seals do not scrape so often against the adjacent fluid chambers.

Since the fluid chambers have walls defining the openings and the seals come in press contact with the walls outward from the fluid chambers, the sealing performance within the fluid chambers is further enhanced.

When each of the fluid chambers includes a pair of case components, a higher accuracy of dimensions of parts is attained, and the sealing performance of the fluid chambers is further enhanced.

When the sliders are a block divided in sections in circular directions and an annular slider seal mechanism is divided in sections in circular directions, assembling and disassembling the annular slider seal mechanism with a rotating element is more easily facilitated.

When the first and second engagement portions are relatively rotatable within a generally small predetermined angle, a high level of viscous resistance should not be produced for the torsional vibration of a small displacement angle, so that elasticity of an elastic element alone is sufficient to effectively dampening the torsional vibration.

In the event that the second engagement portions are concave while the first engagement portions are projections, the configuration of the device is simple, and both the engagement portions easily mesh with each other.

The chokes are defined by and between the sliders and fluid chambers, and since an accuracy of dimensions is enhanced, a higher level of the viscous resistance is obtained.

DESCRIPTION OF REFERENCE NUMERALS

1 Torque converter
2 Torque converter main body
3 Lock-up device
4 Front cover
14 Torsional vibration dampening deice
23 Annular slider seal mechanism
26 Arc-shaped fluid chamber
30a Seal
33 Slider Various derails of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A torque converter having lock-up mechanism and a vibration dampening device comprising:

a power input member and a power output member disposed concentrically and being relatively rotatable with respect to one another;

a disk member connected to said power output member having a plurality of protrusions extending therefrom;

first and second side plates disposed interposed about said disk member, connected to said disk member for limited rotary displacement with respect to said disk member said disk member being interposed between said first and second side plates, portions of said first and second side plates defining an annular chamber therebetween;

a spring member disposed between a portion of said disk member and said first and second side plates elastically coupling said disk member and said first and second side plates;

a piston member connected to said first and second side plates for rotation with said first and second side plates, said piston member selectively engagable with said power input member;

at least two fluid chambers defined within said annular chamber, coupled to said first and second side plates and each of said fluid chambers having an elongated circumferential opening formed therein;

a slider disposed within at least one of said fluid chambers sectioning said fluid chamber into two sub-chambers, said slider being relatively movable in the circular directions within said fluid chamber, and having an engagement portion extending into said elongated circumferential opening and a groove, one of said protrusions extending through each of said elongated circumferential openings into said groove, said slider and inner surfaces of said fluid chamber defining a choke through which fluid passes in response to rotary displacement of said slider with respect to said fluid chamber;

a seal positioned within said fluid chamber, rotatable with said slider in unity, and sealing said elongated circumferential opening.

2. The torque converter as in claim 1, wherein each of said fluid chambers is formed with a circumferential inner wall, a portion of which forming said elongated circumferential opening, and said seal contacts said circumferential inner wall to seal said elongated circumferential opening in response to increased fluid pressure within said fluid chamber.

3. The torque converter as in claim 1, wherein each of said fluid chambers comprises a pair of inter-fitting arcuate shaped chamber case members.

4. The torque converter as in claim 3, wherein each of said pair of inter-fitting arcuate shaped chamber case members is formed with a circumferential inner wall, which in combination define said elongated circumferential opening, and said seal contacts said circumferential inner walls to seal said elongated circumferential opening in response to increased fluid pressure within said fluid chamber.

5. The torque converter as in claim 4, wherein said slider and said seal are formed integrally.

6. The torque converter as in claim 4, wherein each of said pair of inter-fitting arcuate shaped chamber case members is formed with a gap between each of said circumferential inner walls and a case portion of each of said inter-fitting arcuate shaped chamber case members, said seal disposed within said gap for circumferential movement.

7. The torque converter as in claim 1, wherein said slider is comprised of two separate slider elements, each slider element being formed integrally with an associated seal member, each associated seal member having an elongated arcuate shape and being formed with one of said slider elements at each end of said seal member and each of said ends of said seal member extending into separate adjacent fluid chambers.

8. A torque converter having lock-up mechanism and a vibration dampening device comprising:

a lock-up mechanism disposed between an input portion of a torque converter and an output portion of a torque converter, said lock-up mechanism having a fluid filled vibration dampening mechanism, said fluid filled vibration dampening mechanism formed with:

a plurality of annularly arranged arc-shaped fluid chambers coupled to one of said input portion and said output portion for rotation therewith, each of said arc-shaped fluid chambers formed with an elongated opening on a radially inner portion extending circumferentially;

a plurality of annularly arranged slider seal members, each of said slider seal members formed with arc-shaped seal portions and two block-shaped slider elements, one of said block-shaped slider elements formed at each end of said arc-shaped seal portion, said arc-shaped seal portion extending between adjacent ones of said arc-shaped fluid chambers such that said block-shaped slider elements are disposed in said adjacent ones of said arc-shaped fluid chambers, said arc-shaped seal portions engaging a portion of said arc-shaped fluid chambers adjacent to said elongated openings to seal said elongated opening, and said slider seal members engaging one of said input portion and said output portion for rotation therewith, said block-shaped slider elements dividing said fluid chambers into separate sub-chambers and being movable relative to said fluid chambers in circular directions, and chokes being defined between inner surfaces of said fluid chambers and outer surfaces of said block-shaped slider elements for creating fluid flow resistance in response to relative movement of said block-shaped slider elements in said fluid chamber.

9. The torque converter as in claim 8, wherein said fluid chambers comprise wall portions defining said elongated openings, and said arc-shaped seal portions contact said wall portions to seal said elongated openings in response to fluid pressure within said fluid chambers.

10. The torque converter as in claim 8, wherein each of said fluid chambers comprises a pair inter-fitting case members.

11. The torque converter as in claim 8, wherein two of said block-shaped slider elements are disposed end to end in each of said fluid chambers, each of said two of said block-shaped slider elements from adjacent ones of said slider seal members.

12. A torque converter having lock-up mechanism and a vibration dampening device comprising:

a front cover and a power output element of a torque converter configured for torque transmission from said front cover to said power output element;

a piston element selectively engagable with said front cover;

a disk-like element coupled to said power output element for rotation therewith and having a plurality of first engagement portions, an elastic element disposed between said piston element and said disk-like element so as to restrict relative rotation between them;

a torsional vibration dampening device for dampening torsional vibration of torque transmitted from said piston element to said disk-like element, said torsional vibration dampening device including:

a plurality of arc-shaped fluid chambers coupled to said piston element for rotation therewith, each of said arc-shaped fluid chambers having an elongated opening extending circumferentially;

a plurality of annular slider seal elements, each formed unitarily with an arc-shaped seal portion and two block-shaped slider elements, one of said block-shaped slider elements at each end of said arc-shaped seal portion, each of said annular slider seal elements further formed with second engagement portions engaging said first engagement portions, said slider elements dividing each said fluid chamber into two subchambers and being movable in circular directions relative to said fluid chambers, and said slider seal elements extending between adjacent ones of said fluid chambers to seal said elongated openings, and chokes defined between inner surfaces of said fluid chambers and outer surfaces of said block-shaped slider elements allowing the passage of fluid between said subchambers in response to relative movement of said slider seal elements.

13. The torque converter as in claim 12, wherein each of said fluid chambers has circumferential walls defining said elongated opening, and said slider seal elements contact said walls to seal said elongated openings in response to increased pressure within said fluid chambers.

14. The torque converter as in claim 12, wherein each of said fluid chambers comprises a pair of inter-fitting case components.

15. The torque converter as in claim 12, wherein the first and second engagement portions engage one another but are relatively rotatable with respect to one another within a predetermined range of angular displacement.

16. The torque converter as in claim 12, wherein the second engagement portions are concave grooves, and said first engagement portions are projections which extend through said elongated openings and are insertable into said concave grooves.

* * * * *